(12) United States Patent
Achlioptas et al.

(10) Patent No.: US 7,693,050 B2
(45) Date of Patent: Apr. 6, 2010

(54) STATELESS, AFFINITY-PRESERVING LOAD BALANCING

(75) Inventors: Dimitris Achlioptas, Seattle, WA (US); Sean B House, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 950 days.

(21) Appl. No.: 11/106,080

(22) Filed: Apr. 14, 2005

(65) Prior Publication Data

US 2006/0233106 A1 Oct. 19, 2006

(51) Int. Cl.
 *H04L 12/26* (2006.01)
(52) U.S. Cl. .................. 370/229; 709/217
(58) Field of Classification Search ......... 370/216–228, 370/254–258, 389, 395.32, 401
See application file for complete search history.

(56) References Cited

U.S. PATENT DOCUMENTS

| | | | | |
|---|---|---|---|---|
| 5,072,217 | A * | 12/1991 | Georgiou et al. ............ | 370/360 |
| 5,475,685 | A * | 12/1995 | Garris et al. ................ | 370/235 |
| 6,049,530 | A * | 4/2000 | Petersen et al. ............ | 370/248 |
| 6,201,755 | B1 | 3/2001 | Pillar et al. | |
| 6,351,775 | B1 | 2/2002 | Yu | |
| 6,421,713 | B1 * | 7/2002 | Lamparter .................. | 709/216 |
| 6,424,992 | B2 | 7/2002 | Devarakonda et al. | |
| 6,748,414 | B1 | 6/2004 | Bournas | |
| 6,963,582 | B1 * | 11/2005 | Xu .............................. | 370/401 |
| 7,051,066 | B1 * | 5/2006 | Albert et al. ............... | 709/202 |
| 7,287,030 | B2 * | 10/2007 | Margolus et al. ........... | 370/230 |
| 7,317,693 | B1 * | 1/2008 | Roesch et al. .............. | 370/252 |
| 2002/0080789 | A1 * | 6/2002 | Henderson et al. ......... | 370/401 |
| 2002/0143953 | A1 * | 10/2002 | Aiken, Jr. ................... | 709/227 |
| 2002/0161839 | A1 * | 10/2002 | Colasurdo et al. .......... | 709/204 |
| 2003/0023669 | A1 * | 1/2003 | DeLima et al. ............. | 709/203 |
| 2003/0074395 | A1 * | 4/2003 | Eshghi et al. ............... | 709/203 |
| 2003/0103459 | A1 * | 6/2003 | Connors et al. ............. | 370/235 |
| 2003/0202511 | A1 * | 10/2003 | Sreejith et al. .............. | 370/389 |
| 2003/0223431 | A1 * | 12/2003 | Chavez et al. .......... | 370/395.42 |
| 2004/0139148 | A1 * | 7/2004 | Norton et al. ............... | 709/200 |

(Continued)

OTHER PUBLICATIONS

R. Kleinberg and T. Leighton. Consistent Load Balancing via Spread Minimization. Proceedings of the 35th Annual ACM Symposium on Theory of Computing, pp. 565-574, 2003.

(Continued)

*Primary Examiner*—Gregory B Sefcheck
*Assistant Examiner*—Joshua Smith
(74) *Attorney, Agent, or Firm*—Lee & Hayes, PLLC

(57) ABSTRACT

The invention relates to an architecture that facilitates load balancing among a plurality of hosts and preserve session affinity to a given host. An incoming stream of data packets that include packet sessions is input to one or more forwarding mechanisms for forwarding to one or more hosts. The forwarders generate a routing function that takes into consideration host availability, and distributes session packets according to the routing function. A session is distributed to the same host to preserve session affinity. When host availability changes, a new routing function is generated, such that any new session is routed according to the new routing function and existing sessions are routed according to the old routing function. When the old routing function becomes irrelevant, it is phased out. An optimization utilizes a maximally backward compatible hash function to minimize the differences between the old and new routing functions.

19 Claims, 10 Drawing Sheets

U.S. PATENT DOCUMENTS

| | | | |
|---|---|---|---|
| 2004/0190526 A1* | 9/2004 | Kumar et al. | 370/395.21 |
| 2004/0220975 A1* | 11/2004 | Carpentier et al. | 707/200 |
| 2004/0264481 A1 | 12/2004 | Darling et al. | |
| 2005/0050202 A1* | 3/2005 | Aiken et al. | 709/227 |
| 2005/0108071 A1 | 5/2005 | Jain et al. | |
| 2005/0154768 A1 | 7/2005 | Theimer et al. | |
| 2005/0213570 A1* | 9/2005 | Stacy et al. | 370/389 |
| 2006/0087968 A1* | 4/2006 | Bowen et al. | 370/229 |
| 2006/0187818 A1* | 8/2006 | Fields et al. | 370/216 |
| 2006/0193328 A1* | 8/2006 | Rao et al. | 370/395.32 |
| 2006/0251109 A1* | 11/2006 | Muller et al. | 370/463 |
| 2007/0011685 A1 | 1/2007 | Yim et al. | |
| 2007/0294754 A1 | 12/2007 | Finkelstein et al. | |
| 2008/0019351 A1* | 1/2008 | Piper et al. | 370/352 |
| 2008/0209273 A1 | 8/2008 | Bahl et al. | |
| 2008/0320003 A1 | 12/2008 | Heinson et al. | |
| 2009/0086640 A1 | 4/2009 | Zhang et al. | |
| 2009/0086741 A1 | 4/2009 | Zhang et al. | |
| 2009/0089438 A1 | 4/2009 | Agarwal et al. | |
| 2009/0222553 A1 | 9/2009 | Qian et al. | |

OTHER PUBLICATIONS

E. Vaynshteyn. Applications of Consistent Hashing. World Wide Web Consortium Working Draft, last viewed on Jul. 22, 2004. http://www.mit.edu/people/ecoder/hashing_report.pdf.

D. Karger, et al. Web Caching with Consistent Hashing. Proceedings of the Eighth International Conference on World Wide Web, 1999. 16 pages.

D. Karger, et al.. Consistent Hashing: Load Balancing in a Changing World. Jul. 1, 1997. 38 pages. http://theory.Ics.mit.edu/~karger/Papers/Talks/Hash/.

System Method for Performing Client-Centric Load Balancing of Multiple Globally, Nov. 16, 2000.

Distributed Load Balancer (MS1-4809US), Aug. 11, 2008.

* cited by examiner

STATELESS, AFFINITY-PRESERVING LOAD BALANCING

TECHNICAL FIELD

This invention is related to data packet distribution systems and methods, and more specifically, to a system where load balancing is maintained among hosts as the data packets are distributed to the hosts.

BACKGROUND OF THE INVENTION

Global communications networks such as the Internet are now ubiquitous with an increasingly larger number of private and corporate users dependent on such networks for communications and data transfer operations. As communications security improves, more data can be expected to traverse the global communications data backbone between sources and destinations (typically, server hosts) placing increasing demands on those entities that handle and store data. Such increased demands are typically addressed at the destination by adding more switching devices and servers to handle the load. However, this can be an expensive proposition in terms of hardware, software, setup, and administration.

Network load-balancers provide client access to services hosted by a collection of servers (herein known as "hosts"). Clients connect to a load-balancer, which transparently (to the clients) forwards them to a host according to a set of rules. This general load balancing context includes the following: packets form sequences, called sessions; sessions should be allocated among the available hosts in a "balanced" manner; and, every packet of each session should always be directed to the same host, so long as the host is alive (the latter is known as "session affinity").

This problem is most often solved through the use of a single monolithic load-balancer that monitors the status (liveness/load) of the hosts and maintains state in the form of a table of all active sessions. When a new session arrives, the load-balancer selects the least-loaded host that is available and assigns the session to that host. In order to provide session affinity, the load-balancer must "remember" this assignment (routing) decision by adding an entry to its session table. When subsequent packets for this session arrive at the load-balancer, a single table lookup determines the correct host. However, an individual load-balancer can be both a single point of failure and a bottleneck; the size of its session table (and thereby the amount of state maintained) grows with increased throughput and routing decisions for existing session traffic require a state lookup (one per packet). Circumventing these limitations requires multiple load-balancers working in tandem (scale-out), and/or larger, more powerful load-balancers (scale-up). However, scaling-out these load balancing devices is complicated, due most notably to the need of maintaining consistent state among the load-balancers. Likewise, scaling them up is expensive, since cost versus throughput in fixed hardware is non-linear (e.g., a load-balancer capable of twice the throughput costs significantly more than twice the price).

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention provides a software architecture for stateless, affinity-preserving load balancing among hosts. The invention mitigates (and/or circumvents) the single largest obstacle to scale-out (state maintenance), and allows significantly more flexible scaling options than those of a hardware load-balancer. Further, unlike a hardware load-balancer whose per-packet processing cost increases with the size of the system (due to the increased cost of state lookup as the session table grows), this invention exhibits a substantially constant per-packet processing cost by way of its statelessness. This facilitates maintaining constant steady-state per-host bandwidth as system size increases. Moreover, the load balancing scheme of the subject invention responds rapidly to changing load/traffic conditions in the system.

The scale-out of load balancing services per the present invention can be achieved utilizing one or more replicated packet forwarders operating in tandem. Generally, the replicated forwarders share part of the task of routing incoming packets, but neither maintains nor shares state with its peers. To maximize scale-out, the forwarders receive incoming packets from an external device whose purpose it is to distribute the incoming stream among the forwarders by sending each packet to one forwarder using methods such as round-robin, random, layer-3/4 hashing, and so forth. It is to be understood that this "first level" packet distribution does not need to have the property that packets from the same session go to the same forwarder. Any degree of preserving session affinity achieved by this first level device is leveraged by the invention and can significantly increase the achievable scale-out. If no such device were available, the forwarders would be required to distribute the traffic among each other through an appropriate mechanism between forwarders.

The forwarders employ one or more routing functions (e.g., hash functions) that assign incoming packets to available hosts that service the packets. Given the same information about the state/availability of the hosts in the system, the forwarders generate identical routing functions, independently, based on a static pre-agreed upon protocol. This sharing of current "system conditions" is effectively the only shared information among the forwarders. The input to a routing function is an identifier that uniquely identifies the session to which the packet belongs (herein known as a "session identifier" or "session ID"), and the output is the host to which the packet belongs. The system manages changes in the system (e.g., in the number of available hosts) that affect packet routing by creating new, additional, routing functions on each forwarder. One feature of the invention is that when such updates are made, the currently used hash functions are generally, not replaced by the new ones. Instead, the new routing functions serve to distribute future load according to the revised state of the hosts, while the old routing functions serve to maintain session affinity for the sessions already present at the time each new hash function is added. To prevent the accumulation of hash functions over time, when the system achieves steady state load distribution employing the new routing functions, efficient protocols are utilized between the forwarders and the hosts to determine which previous routing functions are no longer required.

To the accomplishment of the foregoing and related ends, certain illustrative aspects of the invention are described herein in connection with the following description and the annexed drawings. These aspects are indicative, however, of but a few of the various ways in which the principles of the invention can be employed and the invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
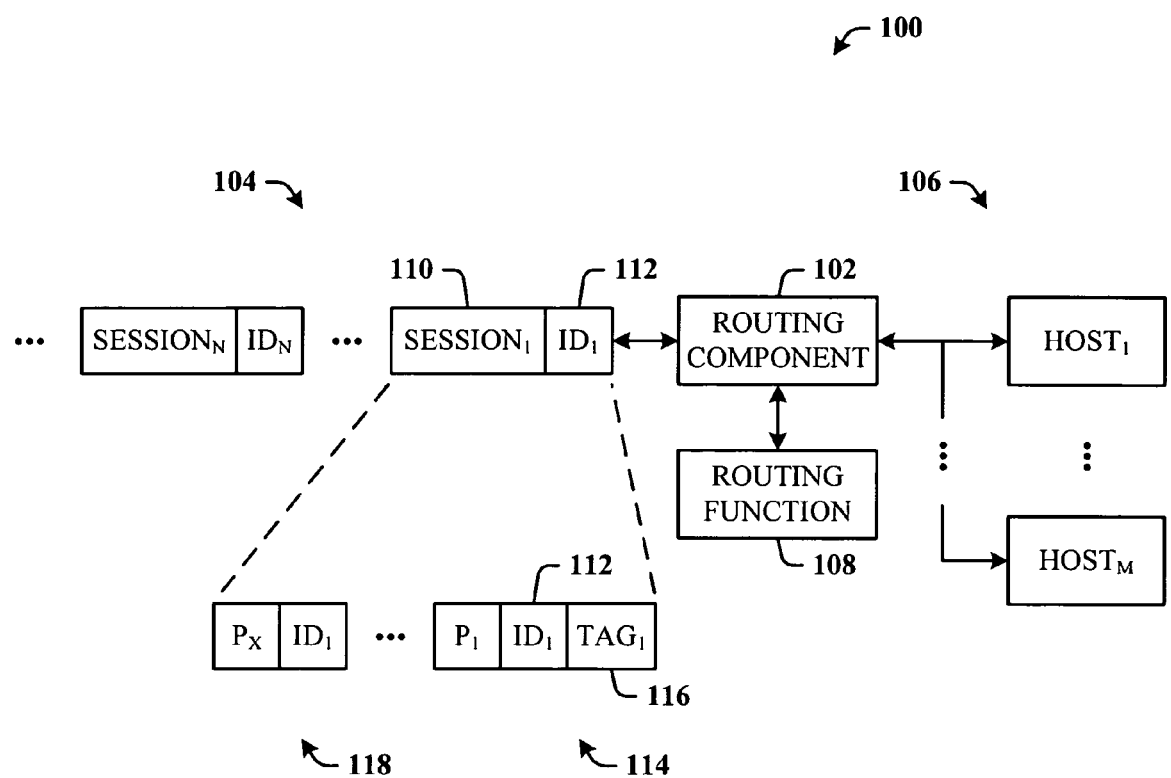
FIG. 1 illustrates a stateless, affinity-preserving load-balancing system in accordance with the subject invention.

The invention is now described with reference to the drawings, wherein like reference numerals are used to refer to like elements throughout. In the following description, for purposes of explanation, numerous specific details are set forth in order to provide a thorough understanding of the invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring now to FIG. 1, a stateless, affinity-preserving load-balancing system 100 is illustrated in accordance with the invention. The system 100 includes two principle components that facilitate stateless, affinity-preserving load balancing. A routing component 102 receives a packet stream 104, and routes the packets thereof to one or more hosts 106 as determined by a routing function 108. The packet stream 104 is composed of multiple sessions (denoted $SESSION_1, \ldots, SESSION_N$), the packets of which can be received into the routing component 102 in a random order in accordance with conventional packet routing processes. The assignment of a session to a host occurs after the routing component 102 has assessed the liveness and load of all the hosts 106, and selects a host that can accommodate the session without undue burden or in accordance with other selection criteria. Any further packets of that session are routed to that selected host.

It is noted that a session is a logical series of requests and responses between two network entities that can span several protocols, many individual connections, and can last an indeterminate length of time. Some common session types include TCP (Transmission Control Protocol), FTP (File Transfer Protocol), SSL (Secure Socket Layer), IPSec(IP Security)/L2TP(Layer 2 Tunneling Protocol), PPTP (Point-to-Point Tunneling Protocol), RDP (Remote Desktop Protocol), etc. The characterization of a session for most protocols is well defined; there is a clear beginning and end to each session, and an associated identifier by which to distinguish the session. Some session types, however, may have a distinct beginning, but an inferred end such as an idle timeout or maximum session duration.

Each packet of a session 110 has a session ID 112 (denoted associatively with the first session as $ID_1$). Additionally, the first packet 114 of each session is distinguishable from the rest of the session packets by both the routing component 102 as well as the hosts 106. As illustrated, the first packet 114 of each session may include a special tag 116 to indicate that it is the first packet of the session (denoted $P_1ID_1$ 114 with special tag $TAG_1$ 116), but this is only illustrative; the mechanisms for distinguishing the first packet of a given session depend on several factors, including the session protocol, and many such mechanisms exist. As illustrated herein, the session 110 has the session $ID_1$ 112, which is understood to represent that each packet in the session 110 has the same session ID associated therewith (e.g., $ID_1$ 112 ). Further, the session 110 can consist of any number of packets, indicated by the last packet X of the session, denoted $P_XID_1$ 118. Although the session 110 is shown as a group of the same session packets entering the routing component 102 sequentially, this is for illustrative purposes only, since such session packet will be transmitted essentially randomly among, for example, the packets of the other sessions to the input of the routing component 102.

The routing component 102 detects and interrogates each session packet for routing information that includes the session ID 112, the special tag 116 on the first session packet 114, and the last session packet 118. Thus, any packet that is not either the first packet 114 or the last packet 118, is an intermediate session packet. Moreover, when a session ID has been generated and assigned, it will not be used again for subsequent sessions, such that there will not be ambiguity regarding the session to which a given packet belongs. Generally, an assumption can be made that a given session ID is unique for a session, whereby uniqueness is provided by standard network principles or components.

In accordance with the invention, the routing component 102 directs each session packet to a designated host (denoted $HOST_1, \ldots, HOST_M$) as predefined by the routing function 108. Since, for each session packet, the session ID 112 is used as the input to the routing fiction 108, session affinity is preserved; that is, each packet of a given session 110 can be routed to the same host by routing function 108. Further, sufficient load-balancing occurs, since the routing component 102 determines to which of the hosts 106 each session will be assigned and routed, taking into consideration the current loading state of all of the hosts 106.

Thus, the invention generates and utilizes one or more routing functions that define the current availability of one or more of the destination hosts. The routing function also takes into consideration destination loading such that load-balancing is performed between the available hosts. Packets of the same session continue to be routed to the same destination host to preserve session affinity.

Figure 2:
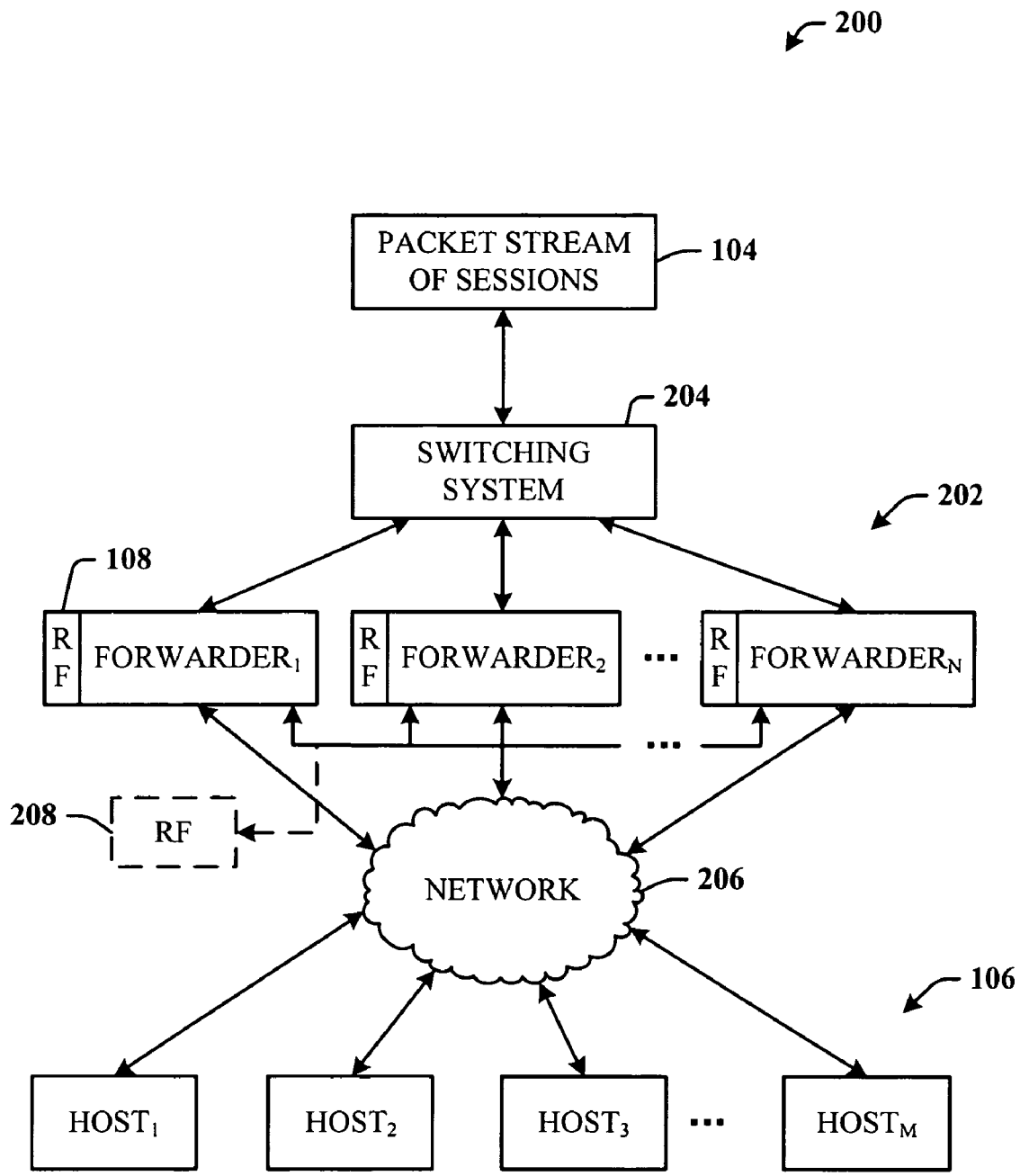
FIG. 2 illustrates a system where the routing component of FIG. 1 comprises a plurality of forwarding components (forwarders) to route session packets to the appropriate one or more hosts.

Referring now to FIG. 2, there is illustrated a scale-out system 200 in accordance with the invention The subject architecture supports scale-out such that the functionality of the routing component of FIG. 1 can be enhanced by employing a plurality of such routing components (herein known as "forwarders") to handle increased packet traffic for larger and growing applications.

The sequence of packets 104 is received into the forwarders 202 (also denoted FORWARDER$_1$, FORWARDER$_2$, ... ,FORWARDER$_N$) from any of a number of similar or different types of data sources (not shown). In support of distributing the session packets of packet stream 104 to the forwarders 202, a very fast switching system 204 can be employed. The switching system 204 takes as input the entire input stream 104 and distributes it to the forwarders 202 by sending each packet to one forwarder. The switching system 204 may be either software or hardware and may distribute the packets to the forwarders using mechanisms such as round-robin, random, or layer-3/4 hashing (to preserve in-order delivery of packets for a given session), and so forth. The switching system 204 is generally not bound by any requirements involving the session information, e.g., the session ID. The switching system 204 operates to process and route a large number of session packets to any number of the forwarding components 202 without regard for session affinity. For example, the session packets can be randomly switched or directed to any of the forwarders 202 from the switching system 204.

Note that this switching system 204 is not a requirement of the invention, but rather an observation that can significantly improve the achievable scale-out if such a system is available. If no such switching system is available, the forwarders 202 can begin by distributing the packet streams 104 among each other, in a similarly random, round-robin, etc., fashion.

The forwarders 202 are responsible for classifying the incoming session packets received from the switching system 204, load-balancing the packet traffic across a network 206 (which can be, for example, a LAN, WAN, or the Internet) among the plurality of hosts 106, and facilitating that session affinity is maintained once a session is established with a host. Each forwarder achieves load-balancing and session affinity by consulting an identical routing function 108 to process each session packet (thereby rendering which forwarder processes a given session packet irrelevant). These identical routing functions are generated by each forwarder independently given the same state information for the available hosts 106.

In one implementation in accordance with the invention, generation of the routing function is performed by the routing component 102 (of FIG. 1). However, it is to be appreciated that generation thereof can be performed by suitable means external to the routing component. For example, each forwarder can access a routing function 208 that is stored centrally and accessed by each of the forwarders when needed.

With respect to the routing function, a fundamental problem in conventional systems is that the system needs to "remember" what to do with the session packets once a session is established with a given host. Finding a least loaded server is not expensive. However, the process of making a determination as to where each and every packet should be sent by searching a look-up table to determine which was the least loaded server at the time the corresponding session begun is very costly. Thus, the routing table can eventually require a large physical memory for all of the sessions and the throughput required. Because a large memory is needed and that memory must now be in a single computing system, the concept becomes problematic as the system grows.

Implementation of the routing function alleviates the need for the large memory and expensive processing required for searching the table. The routing function contains the "memory" necessary to preserve affinity for the existing sessions in the system. Moreover, there can be many different routing functions employed to facilitate stateless, affinity-preserving load balancing. If a host drops offline or is simply overwhelmed, for example, where it can no longer handle its input stream effectively, the forwarders 202 (see e.g., FIG. 2) monitor this, and take action by generating a new routing function to address the host availability problem. In support thereof, the forwarders 202 maintain a table of the routing functions, and perform periodic cleansing of the table of old routing functions. This can be done when a new routing function is created and added to the table, for example, or at any convenient time. The processes associated with introduction and purging of multiple routing functions will be described in greater detail hereinbelow.

Each of the forwarders 202 has the capability to assess availability of the hosts 106, and in response thereto, generate the routing function 108 for local storage and use. Each received packet is then processed against the local routing function 108 to determine to which of the hosts 106 the packet will be routed, and then routed to the assigned host. Given that packets of a session can be switched from the switching system 204 to any of the forwarders 202, each forwarder generates the identical routing function to further transmit packets of the same session to the same host. It is to be appreciated, however, that it is not required that each of the forwarders 202 include the routing function 108. Where the forwarders 202 are interconnected, only selected forwarders need to include the routing function 108 in a partially distributed fashion. For example, forwarders can be paired such that only one of the two forwarders stores the routing function, and whose processing capabilities support the added processing of the other forwarder. In yet another implementation, there can be an external routing function system 208 that handles all of the routing function processing of the pair of forwarders, or where a suitable system is provided, routing function processing for all of the forwarders.

If a routing function such as a hashing function is to be used to provide load balancing and session affinity, then the input to the hashing function should be some identifier that uniquely identifies a session, e.g., the session identifier. This is because sessions can span multiple protocols and multiple connections; the session identifier is the only persistent parameter on which to hash. For different session types, the session identifier can be drastically different; for a TCP connection, the session identifier is the TCP 5-tuple; for SSL, the session identifier is a 32-byte binary number; for a web commerce application, the session identifier may be an HTTP cookie.

Note that some protocols, such as TCP, lend themselves very naturally to session ID extraction, while others, such as SSL do not. Therefore, for such protocols, it may be necessary to add a layer of "intelligence" on top of the hashing scheme in order to associate arbitrary packets with known sessions in progress. The details of this "intelligence" are beyond the scope of this description. When the session identifier for a given packet is recognized, the hashing scheme depicted herein operates as described to provide the required session affinity.

Referring now to FIGS. 3-8, there is illustrated a scale-out and load balancing process in accordance with the invention. While, for purposes of simplicity of explanation, the one or more methodologies shown herein, e.g., in the form of a flow chart, are shown and described as a series of acts, it is to be understood and appreciated that the invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

Figure 3:
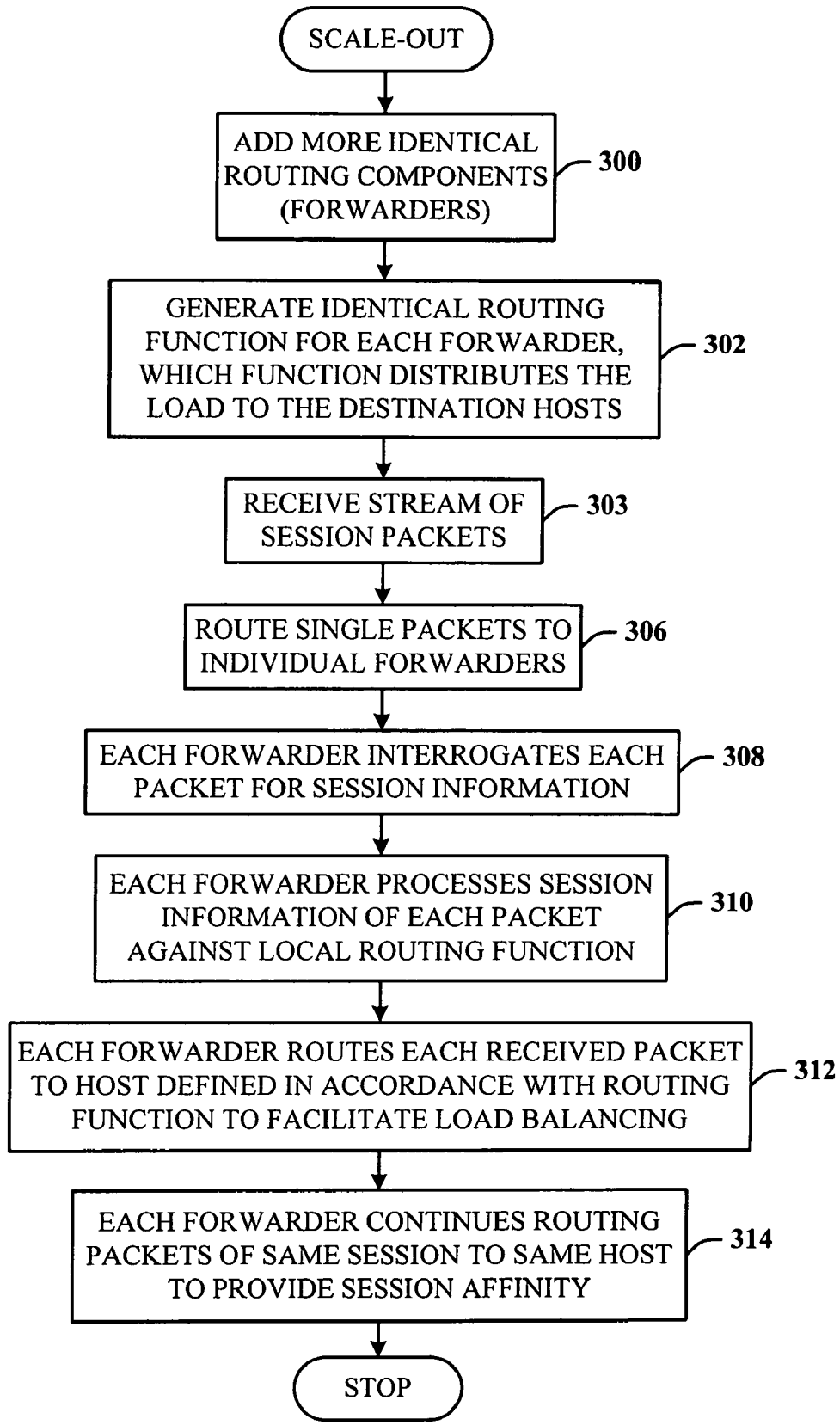
FIG. 3 illustrates a scale-out process in accordance with the invention.

Proceeding to 300 of FIG. 3, the routing component 102 of FIG. 1 is supplemented with one or more additional routing components. At 302, each forwarder generates an identical routing function that distributes the packet load in a balanced manner to the available hosts. At 304, the forwarders continue to receive session packets in a random manner, for example, in accordance with conventional packet routing schemes and technologies. At 306, individual session packets are routed to inputs of the forwarders. Each forwarder then interrogates the packets for session information, as indicated at 308. At 310, the session information is then processed against the routing function local to the forwarder. At 312, each forwarder routes the packet to the host defined in accordance with the routing function to facilitate load balancing. At 314, each forwarder continues routing session packets of the same session to same host until the last packet is detected, to preserve session affinity.

Figure 4:
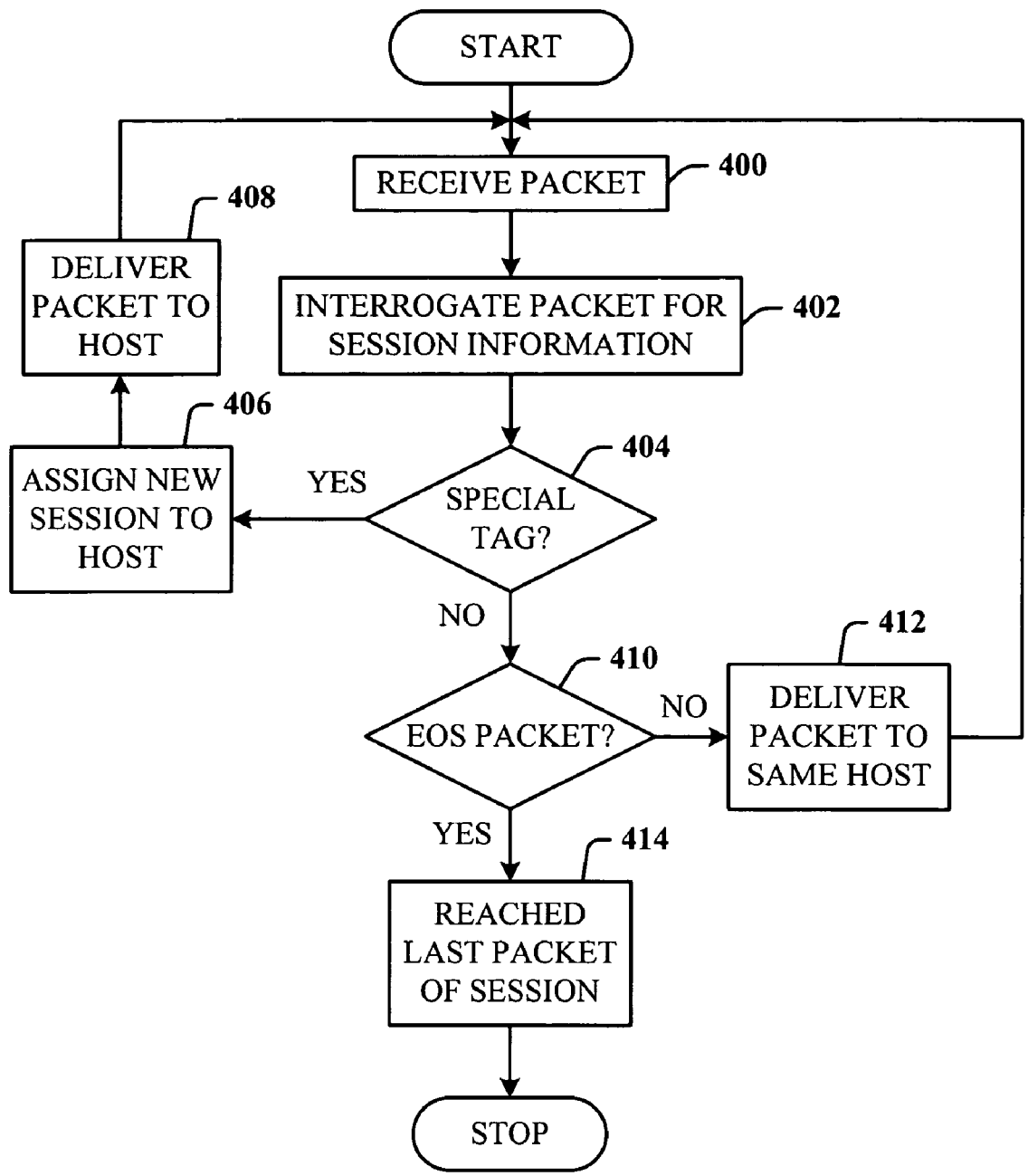
FIG. 4 illustrates a methodology of packet interrogation in accordance with the invention.

Referring now to FIG. 4, a methodology of packet interrogation is illustrated. At 400, a packet is received into a forwarder. At 402, the forwarder interrogates the packet for session information. At 404, the forwarder analyzes the packet for a special tag. If the packet includes the special tag, indicating it to be the first packet of a new session, progress is to 406, where the new session is assigned to a host. At 408, the packet is then forwarded to the host. The forwarder then processes the next packet. It is to be appreciated that packet processing need not be sequential, but where such capability is provided, can occur in a parallel fashion using parallel processing architectures or pipelined data processing techniques for higher throughput.

If the packet does not include the special tag, progress is from 404 to 410 where the system determines if the packet is the EOS (end-of-stream) packet. If NO, at 412, the packet is an intermediate session packet and is delivered to the same host. The system then receives the next packet. On the other hand, if the session packet is marked as the EOS packet, flow is from 410 to 414 where the session is terminated after routing the EOS packet to the same host.

In a world where the state of the available hosts never changes, the load balancing problem is trivial. A single routing function shared among a set of forwarders is sufficient to ensure that every packet of a given session is delivered to the same host regardless of which load balancer handles any given packet of the session. However, in the real world, the availability of the hosts will change over time. For example, a host may move to an offline state as a result of hardware or software failure. Additionally, a host can remain online, yet its availability is impacted. For example, the host may exhibit a load balance skew such as an overloaded condition or an under-loaded condition that requires a load balancing change. Still further, a new host can be added that will impact a change in load balancing. Changes to the availability of the host population are the most cumbersome operations related to session affinity because host changes further require a change in the routing function of the forwarders. In such instances, the architecture of the invention employs additional routing functions.

A new routing function must therefore be generated to reflect each change in the availability of the hosts. It is clear that switching to a new routing function and discarding the currently used one can cause some portion of the existing sessions in the system to malfunction since the new routing function may route the corresponding packets to the wrong host. An important concept herein is not to switch to the new function, but rather to add the new function for processing in parallel with the existing function over time. When packets arrive, the corresponding session identifier is applied to both the existing and the new functions. If the answer for host routing from both functions is the same, then there is no ambiguity, and the packet is forwarded to the correct host. If, however, the results from the two functions differ, then the correct host destination is ambiguous. The packet is then duplicated and sent to both hosts. Because the hosts are the authoritative source of knowledge concerning the sessions that they are servicing, it is a trivial process for them to discard packets that they receive erroneously.

Essentially, to allow the forwarders to be stateless, the session affinity problem is pushed to the network and hosts when ambiguity exists. By doing so, it can be guaranteed that the packet is delivered to at least the correct host, and potentially some incorrect hosts who then discard the packet. Put differently, the old routing functions contain "memory" necessary to preserve affinity for the existing sessions in the system. Thus, it is important to obtain the benefits of this memory by not switching to the new routing function, but by adding the original routing function to the list of functions to be processed.

Put another way, forwarders can be considered as a set of w computers, any of which can fail or malfunction. Each forwarder maintains a sequence of routing functions (that take as an input a session ID and provide an output that is a host), and a list L of hashing exceptions. This sequence of routing functions are denoted as $(f_1, f_2, \ldots, f_t)$ and can be hash functions. At any given moment, the last function in the list, $f_t$, is called the driving routing function for that forwarder. All functions $f_i$ map identifiers into a subset of all hosts (different functions will have different ranges). The list of exceptions L contains pairs of the form [identifier, host] and serves as an explicit list of routing decisions that supersede the sequence of routing functions $(f_1, f_2, \ldots, f_t)$. The purpose and generation of exceptions is discussed in greater detail herein below.

When a forwarder receives a packet with identifier p, it executes the following. If this is the first packet of a session, it marks the first packet as special and sends it to $f_t(p)$. Otherwise, the list of exceptions is consulted, and if the identifier is in that list, the record tells the forwarder exactly where to send the packet. Otherwise, let U be the following multiset: the hosts $f_1(p), \ldots, f_t(p)$. Remove any duplicates from U to get a set S, and send the packet to all of the hosts in set S.

Each host h maintains a session list $L_h$ of all the sessions it is currently hosting, which is trivial overhead for each host. For example, a host h consumes a received packet with packet identifier p, if $p \in L_h$; otherwise, the host drops it. In contrast to conventional architectures, the first packet of each session will be marked as special. A host always consumes a special packet, and a forwarder sends a given special packet to only one host. The role of the hosts in load balancing is therefore minimal, but critical; each host keeps track of all the sessions it is currently hosting, and inspects each packet it receives to determine whether it should consume it or drop it (by consulting its list of hosted sessions).

The evolution of the routing function begins by the forwarders taking a routing function f and placing it at the end of their routing function sequence (i.e., making it the driving routing function). As long as no host changes are noted, the system operates according to the existing set of routing functions. When changes in host availability are noted, intuitively, a new routing function is generated aimed at appropriately accommodating the new steady-state load distribution (assuming no further changes in host availability). The idea is that host availability changes are relatively infrequent and, as a result, most routing functions will spend sufficient time as the driving function of the system to induce steady state. The non-driving routing functions are there to guarantee session affinity.

After a new routing function f has been added, subsequent packets are addressed according to the old routing function(s) and the new routing function. Consider the packets of a session that was established before the addition of the new routing function f. By induction, all of these packets will reach their assigned host, since the set of routing functions simply increased. At the same time, any host receiving such a packet because of routing function f will drop it, since the packet's session identifier will not be in that host's list (also, by induction). Observe that our earlier care taken by forwarders to trim multisets to sets ensures that the relevant host will not receive multiple copies of the same packet due to multiple routing functions.

Consider the first packet of a new session s that begins after the introduction of routing function f. By assumption, the forwarder receiving this packet will recognize it as special. Therefore, it will mark it as special, and process it only using the driving function $f_r$. This guarantees that the packet will go to a live host that will accept it, for example, host h. All later packets of s will be processed using all routing functions. As a result, host h will receive all such packets because of the driving routing function $f_r$. Moreover, since no host other than host h will ever receive the first packet of s, every such other host will drop all packets of s.

It is noted that each of the forwarders and/or associated processes relating thereto has the capability to distinguish the first packet of a given session from subsequent session packets. Such a first packet is only processed through the newest (or, so called, driving) function, and is not replicated to multiple hosts. This is not only required for correctness in nearly all protocols, but it also ensures that the set of sessions that rely on a routing function does not increase after the routing function stops being the driving routing function in the system. As a result, when all of the sessions that rely on that function eventually terminate, the routing function can be safely removed.

Figure 5:
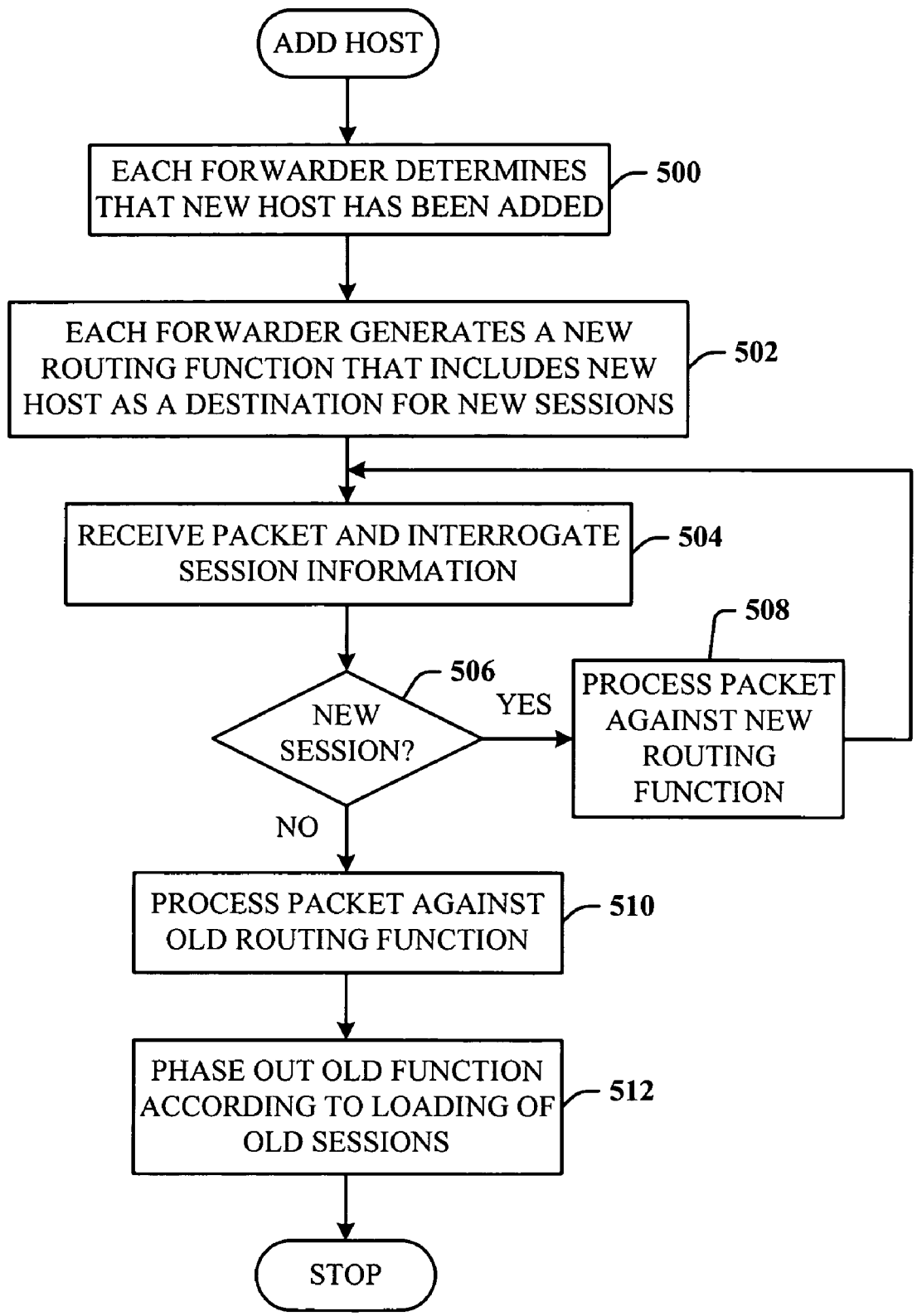
FIG. 5 illustrates a methodology in accordance with the invention when a host is added.

FIG. 5 illustrates a methodology of adding a host in accordance with the invention. At 500, each forwarder determines that a new host has been added. At 502, each forwarder generates a new routing function that includes the new host as a destination for new sessions. This new routing function is also called the driving function. At 504, the next packet is received and interrogated for session information. If the packet is specially marked as the start of a new session, flow is from 506 to 508 to process the packet through the new routing function. In all likelihood, the new session will be routed to the new host, although this is not required to be the case. Flow is then back to 504 to receive and process the next packet. If the packet is determined to not be specially marked, the packet is part of an existing session, and flow is from 506 to 510, where processing is against the old routing function. At 512, eventually, the old routing function is phased out according to the loading requirements of the old sessions. This phase-out feature will be described in greater detail infra.

Figure 6:
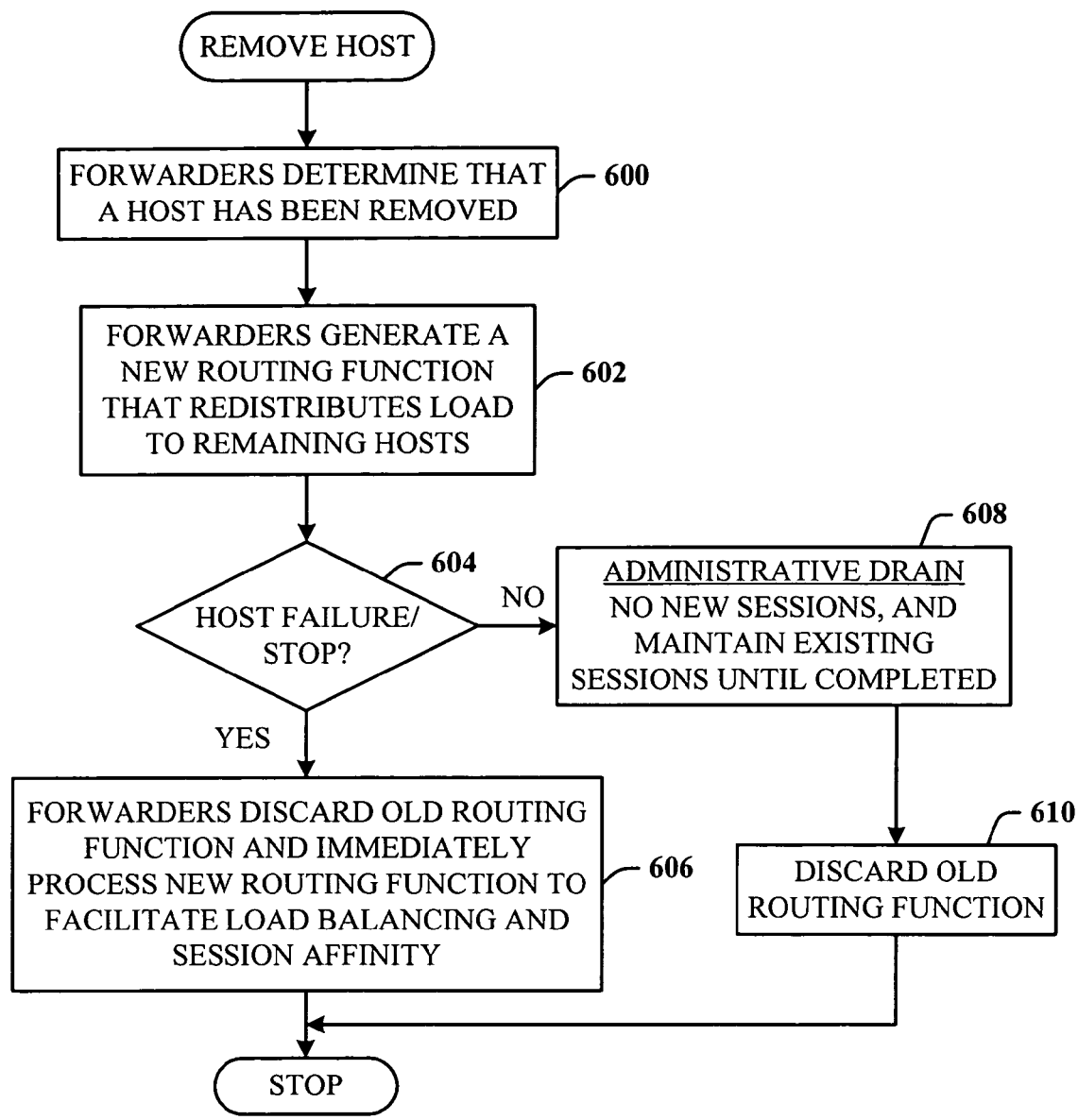
FIG. 6 illustrates a methodology of removing a host in accordance with the invention.

FIG. 6 illustrates a methodology of removing a host in accordance with the invention. At 600, each forwarder determines that a host has been removed. At 602, each forwarder generates a new (or driving) routing function that redistributes the load to the remaining hosts. At 604, the system determines if the host has been removed due to a failure or a stop. If Yes, at 606, the forwarders discard the old routing function and immediately process packets against the new routing function to facilitate load balancing and preserve session affinity. If, on the other hand, the host availability was due to an administrative drain, flow is from 604 to 608 where a controlled shutdown of the host is being employed. No new sessions will be routed to the host, but existing sessions will be processed to completion. At 610, the old routing function can eventually be discarded.

When adding or removing a host as described above with respect to FIGS. 5 and 6, one challenge is that the new routing function required to begin directing new sessions to the different host will also map some of the existing sessions to the new host, which would result in those sessions breaking. Through the use of an intelligent routing function (e.g., a hash function), the number of disrupted sessions can be minimized, but will generally be nonzero. Therefore, a mechanism such as the one described herein can be employed in order to ensure that those sessions do not break. The new routing function, which becomes the driving function used to map all new sessions, ensures that some portion of the new sessions are directed to the new host, while the old routing functions ensure that traffic for existing sessions is received by at least the appropriate host.

In order to minimize the impact of introducing a new hash function, the system uses maximally backward compatible (MBC) routing functions to preserve session affinity. The purpose of using the MBC functions is that, as much as possible, it is desired that the set of routing functions "disagree" on the output for a given input as little as possible. Multiple active routing functions are employed not only to preserve session affinity, but also to account for changes in host availability. Thus, all of the routing functions are processed, and the input packet is duplicated if necessitated by differing destination hosts that are indicated by the routing functions.

In one implementation, the load to the overloaded host is reduced by allowing a reduced number of new sessions to be processed by that host. This impacts system bandwidth to a small degree where a packet is sent multiple times to multiple destinations to ensure the packet reaches the desired host, yet maintains session affinity, an acceptable tradeoff given the extensive problems associated with data restructuring at the failed host that traditionally would be considered. Eventually, it is no longer necessary to keep the old function, as it is no longer needed to preserve session affinity, and can be removed. The routing function can be a special hash function or other type of function that preserves existing host assignments as much a possible.

Note that this mechanism is not limited to two routing functions (the existing function and a new function). If another change in the state of the hosts occurs while two functions are active, a third function (a second new function) can be added to reflect the new state of the host pool, and so on. The cost of doing so is the potential N-way replication of traffic to the hosts (where N is the number of hosts) in the worst case. To reduce the replication of traffic necessary to preserve session affinity, two other techniques can be employed: purging routing functions when they are no longer required, and using exceptions that can supersede use of the routing function(s). An exception is a session for which none of the current routing functions provides the proper affinity. These techniques are described in greater detail below.

Figure 7:
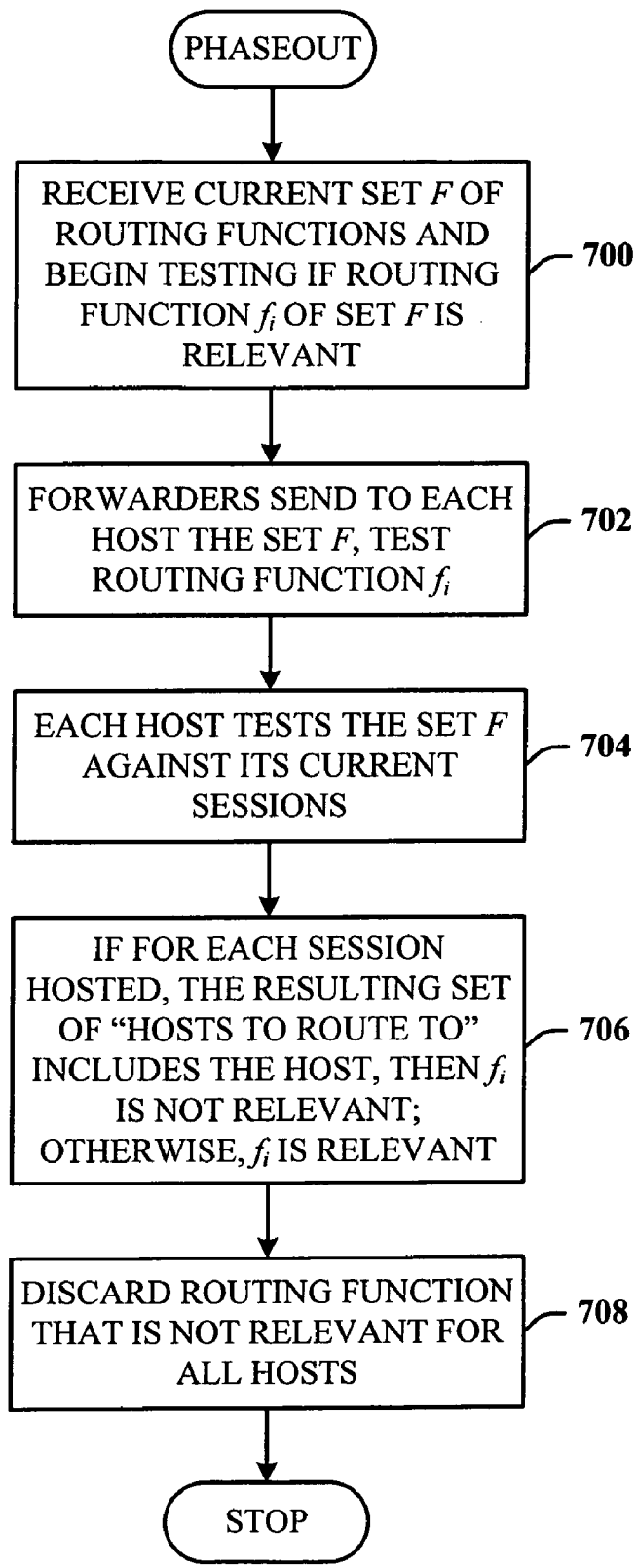
FIG. 7 illustrates a process of phasing out a routing function in accordance with the invention.

Referring to FIG. 7, a process for removing or purging routing functions is described. As routing functions are added, for example, more and more traffic is potentially being replicated. In order to avoid burdening system bandwidth, it is desired to also remove routing functions. As indicated previously, due to the likelihood of multiple active routing functions, two other techniques are useful in reducing the potential for large overhead processing of routing functions that are no longer useful. First, it should be clear that eventually, the "memory" contained in a given routing function is no longer relevant or necessary to preserve session affinity. Therefore, the system can periodically remove routing functions that are no longer relevant, so that in steady-state, only a single, identical routing function is present on each of the forwarders. A routing function becomes irrelevant when there are no sessions present in the system that rely on that function to provide session affinity. To detect this condition, the hosts can be employed to check their session tables against the current set of routing functions to determine the minimum sufficient subset to preserve session affinity for all of their sessions. The purging process amounts to the forwarders requesting the hosts to determine all irrelevant routing functions at once.

In other terms, the current set F of routing functions is received by all the hosts in order to test which routing functions are still relevant. The testing (to be described shortly) is identical on all hosts. Upon completion of this testing, each host sends to the forwarders a message which indicates for each routing function $f_i$ in the set F whether $f_i$ is necessary (relevant) in order to maintain the affinity of sessions currently hosted by the host. If a hash function is deemed irrelevant by all hosts then it is removed from the set F of routing functions, as it is safe to do so without compromising session affinity.

For a host h to test whether a hash function $f_i$ in set F is relevant to it, h considers the sessions it is currently hosting, one by one, as follows. For each session s, it determines the set of hosts to which s would be routed if $f_i$ was to be removed from the set of currently used hash (or routing) functions F. To do this, it simply performs the exact same reasoning as the forwarders do for s, by using the set of routing functions F but with $f_i$ removed. If the resulting set includes h, then clearly $f_i$ is unnecessary with respect to maintaining the affinity of session s to the host h; otherwise $f_i$ is necessary. So, h will report that $f_i$ is irrelevant to it, if and only if the routing function $f_i$ is unnecessary (irrelevant) for every session hosted by h.

Accordingly, at 700 of FIG. 7, a current set F of routing functions is received for testing if a routing function $f_i$ of the set F is relevant. At 702, the forwarders send to each host the set F, and test the routing function $f_i$. At 704, each host tests the set F against its current sessions. At 706, if for each session hosted, the resulting set of "hosts to be routed to" includes the host, then $f_i$ is not relevant. If the host is not included, then $f_i$ is relevant. At 708, the routing function that is not relevant for all hosts can be discarded.

While this mechanism for purging routing functions is described herein as being Boolean (an "all or nothing" operation), it is also possible to force the removal of a routing function before all sessions that require it for session affinity have completed. An exception is a session for which none of the current routing functions provides affinity. These exceptions supersede the routing functions, in that if an exception exists for a given session, the routing function output(s) are irrelevant. So long as the number of exceptions required in order to purge a given hash function is small, it may be advantageous to do so, especially in the case of very long lasting sessions such as with RDP or EPSec/L2TP, for example.

In fact, much more can be said. Let $h_f$ be the set of sessions hosted by host h that fail to map to h using the routing functions in F. If the routing function is not redundant for all hosts, it is determined if the number of non-redundant hosts is sufficiently small. That is, if the size of $$L_f = \bigcup_h h_f$$

is sufficiently small, routing function $f$ can still be removed by simply adding to the list of exceptions, L, the pairs [identifier, host] corresponding to the sessions and hosts in $L_f$.

Figure 8:
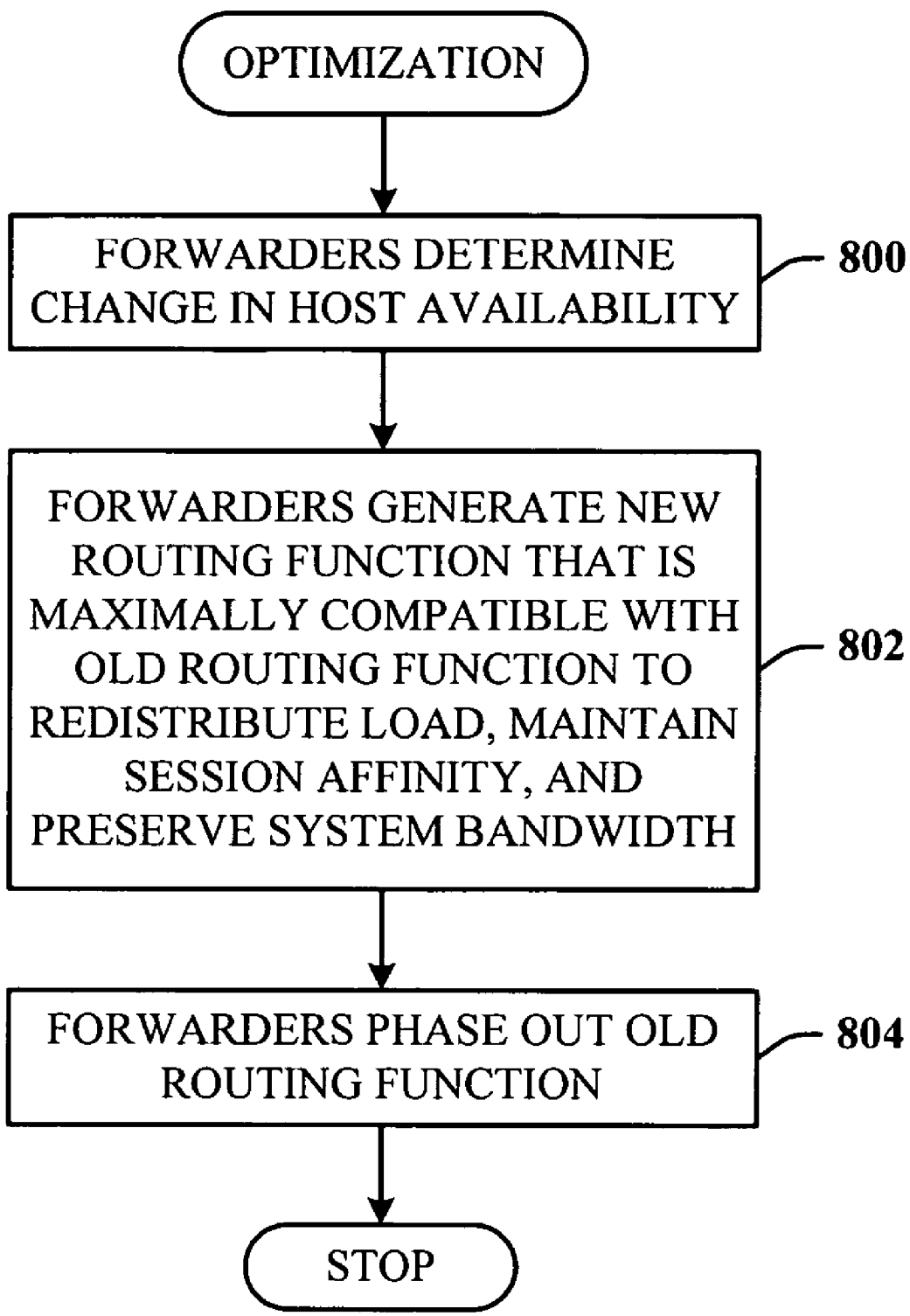
FIG. 8 illustrates an optimization in accordance with the invention.

Referring now to FIG. 8, there is illustrated an optimization in accordance with the invention. At 800, the forwarders determine that a change has occurred in host availability. At 802, the forwarders generate a new routing function that is "maximally compatible" with the old routing function. That is, the session assignments established by the old routing function are preserved as much a possible relative to the new routing function in order to maintain session affinity, redistribute the load, and preserve system bandwidth. At 804, the forwarders then phase out the old routing function according to previously described phase-out procedures.

As indicated hereinabove, one method by which to provide load balancing for the incoming client load is through the use of a routing function that is an MBC hash function that can be used to map incoming packets to hosts. One example of an MBC hash function that provides such a capability is a consistent hash function. Stated simply, given some input related to a given packet, a hash function is executed whose output is the host to which the packet should be delivered. In order to ensure session affinity, the stated input to the hash function is the session ID associated with the given packet.

As far as correctness is concerned, there does not need to be any relationship between the functions $(f_1, \ldots, f_t)$. It is sufficient that the range of each such function is the set of live hosts at the time of its addition. Nevertheless, it is intuitively clear that the system will perform less bookkeeping (and the purging will be much more successful) if each hash function "respects" the previous hash functions as much as possible. In other words, consider that a hash function $f: N \rightarrow \{1, \ldots, k+1\}$ respects a hash function $g: N \rightarrow \{1, \ldots k\}$ if the fraction of inputs on which $f$ and $g$ differ is proportional to 1/k.

The idea is to create a "meta-hash-function" $\Phi$ that takes as input a string $x \in \{0,1\}^q$ and outputs a hash function $f$ whose range is the subset of $\{1, \ldots, q\}$ corresponding to the "1's" in x. It can be said that the function $\Phi$ yields a hash function family, if for any x,x' with Hamming distance of one, $\Phi(x)$ respects $\Phi(x')$. One can consider x as representing the set of live hosts (which set changes dynamically) and of $\Phi$ as a machine for producing appropriate hash-functions. Each host can be partitioned into a large number of virtual hosts and apply hashing to those (for fine load balancing). Additionally, the forwarders will be sharing $\Phi$ so they only need to reach consensus on the changes in x. It is to be appreciated by one skilled in the art that there are many constructions of hash functions that can be employed in accordance with the invention.

Since it is changes in the mappings of session identifiers to hosts that place the principal strain on maintaining session affinity, it is a significant benefit to minimize these changes whenever possible. In fact, the implementation of generating hash functions can be made "session aware", in that the hashing process can be made to minimize the number of disrupted sessions by ensuring that the hash entries that have to change are those with the minimum number of established sessions. Further, the number of sessions that require special handling during hash function transition may be able to be reduced by ignoring sessions with the least stringent requirements for affinity. Such capabilities can be employed using artificial intelligence (AI), which AI capabilities are within contemplation of the invention.

It is within contemplation of the subject invention that the disclosed architecture can be suitably configured to process multiple hash function transitions at any given time. However, there may be reasons to not allow the number of active routing functions to grow above a certain level (e.g., two) and that in order to employ a new hash function, the oldest hash function should first be purged, or purging of the oldest hash function is forced before adding the new hash function (e.g., using exceptions). Note, then, that in one implementation, only one hash function transition may be in progress at any given time. For example, if another host comes online during a hash function transition, the current transition must be terminated before the new host can be added to the target host pool.

Further, depending on the relative cost of a hash function transition, it is conceivable that when a host or hosts are added, the hash function transition is actually a series of transitions in order to quickly "bring the host up to speed." More specifically, when a host or hosts are initially added, a hash function is generated that loads the new host(s) more heavily than the others, as it has no existing load (sessions). Additionally, as the host becomes loaded, subsequent hash function transitions are needed in order to reduce the load percentage of the new host to the optimal value. In one implementation, the new host is initially overloaded, but then the overload situation is corrected over time until a "uniform" load is reached (which is not necessarily uniform by definition).

Transient changes in the capacity of a server due to a server being under- or over-loaded are very similar in hashing behavior to the cases already described above except that the availability is not a Boolean indication (alive or dead), but rather a measure of the server's current capacity, which can vary based on the number and type of sessions that it is currently servicing. Such changes in capacity likewise require the generation of and transition to a new hash function. Therefore, the responsiveness of the load-balance to current the system state must be weighed against the overhead necessitated at the forwarders to transition to a new hash function.

Figure 9:
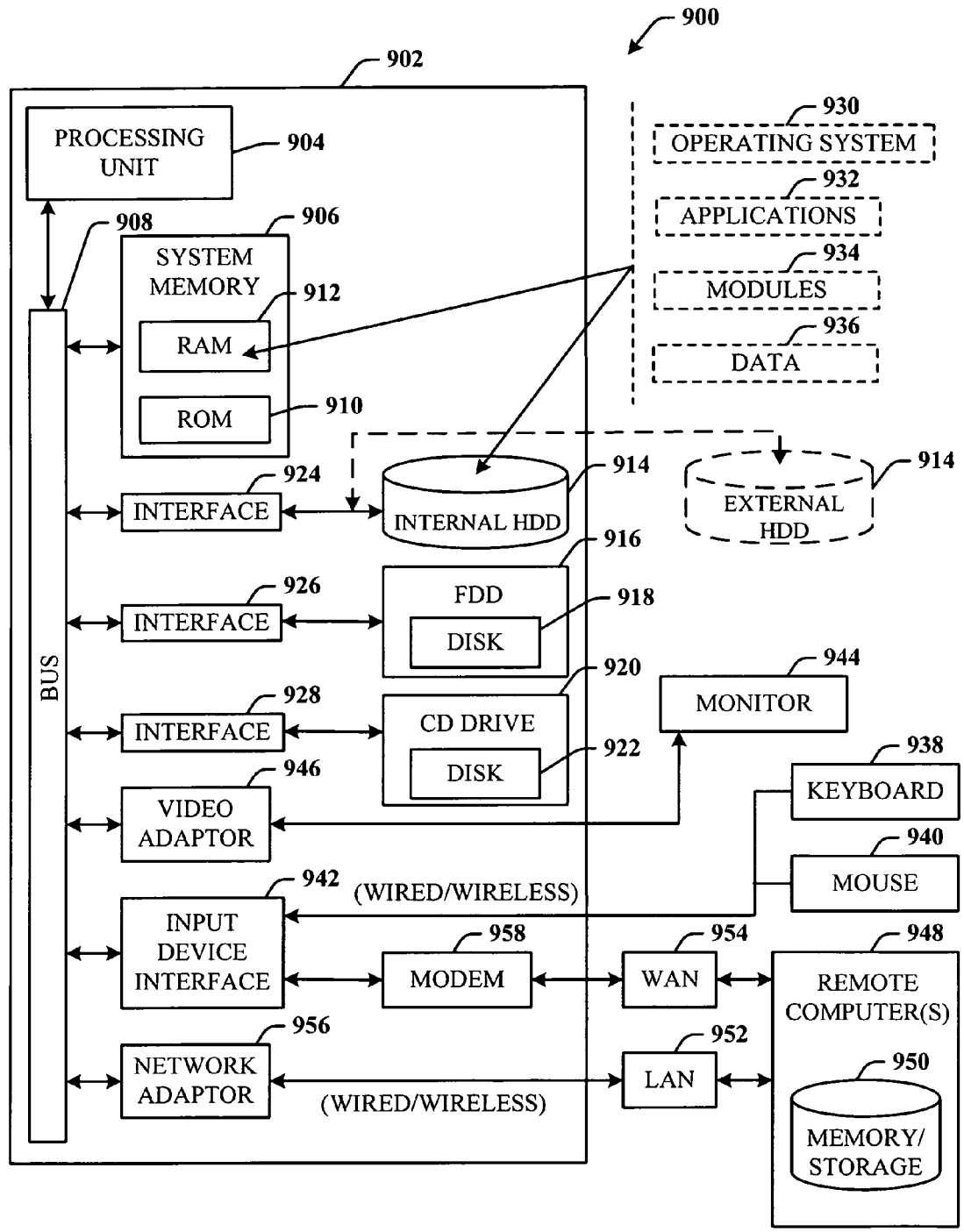
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the invention, FIG. 9 and the following discussion are intended to provide a brief, general description of a suitable computing environment 900 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an exemplary environment 900 for implementing various aspects of the invention that includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the LAN, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and outdoors; that is, anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11a) or 54 Mbps (802.11b) data rate or with products that contain both bands (dual band), so the networks can provide real-world performance similar to the basic 10BaseT wired Ethernet networks used in many offices.

Figure 10:
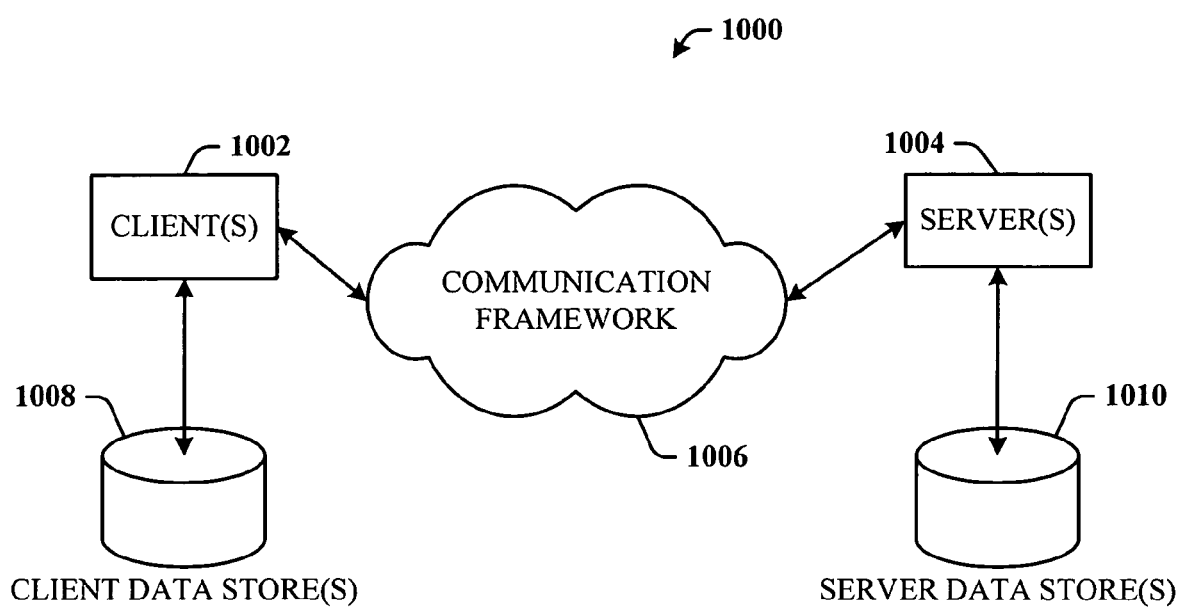
FIG. 10 illustrates a schematic block diagram of an exemplary computing environment in accordance with the invention.

Referring now to FIG. 10, there is illustrated a schematic block diagram of an exemplary computing environment 1000 in accordance with the invention. The system 1000 includes one or more client(s) 1002. The client(s) 1002 can be hardware and/or software (e.g., threads, processes, computing devices). The client(s) 1002 can house cookie(s) and/or associated contextual information by employing the invention, for example. The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the invention. It is, of course, not possible to describe every conceivable combination of components or methodologies for purposes of describing the invention, but one of ordinary skill in the art may recognize that many further combinations and permutations of the invention are

What is claimed is:

1. A system comprising a processor and memory that facilitates stateless, affinity-preserving load balancing among a plurality of hosts, comprising:
   a routing component that receives and processes a stream of packets for one or more hosts, each packet has a session ID unique to its session, and distinguishes the first packet of a session from the rest of the packets in the stream; and
   a routing function independently generated by the routing component to preserve session affinity, so that packets of the same session are routed to the same host based on the session ID, and to provide for a balanced distribution of the packets among the hosts, wherein the routing function is identical to another routing function generated by another routing component, the routing function is generated using shared information about a state and an availability of the plurality of hosts, the routing function defines a relationship between a received packet and a subset of the hosts;
   the routing component that generates a new routing function to reflect a change in the availability of the plurality of hosts, the new routing function is added for processing in parallel with the routing function by applying a corresponding session ID to both the new routing function and the routing function, when results from the new routing function and the routing function differ for a packet, the packet is duplicated and sent to hosts corresponding to both the new routing function and the routing function.

2. The system of claim 1, wherein the routing component classifies data traffic for routing to one of the hosts.

3. The system of claim 1, wherein the routing function is associated with at least one hash function.

4. The system of claim 3, wherein the routing function is a maximally backward compatible (MBC) hash function.

5. The system of claim 1, wherein the routing component comprises a plurality of forwarders, each of which receives at least one packet and processes the packet through the routing function.

6. The system of claim 1, wherein the routing component interrogates the packet for session information and routes the packet to one of the hosts based at least in part on the session information.

7. The system of claim 6, wherein the session information includes at least one of a session ID, a special tag, an end-of-session packet, or any combination thereof.

8. The system of claim 1, wherein the routing component generates a plurality of different routing functions and phases out one or more of the different routing functions over time.

9. The system of claim 1, further comprising a plurality of forwarding components, each of which tracks availability of a plurality of hosts and generates a new routing function through which new sessions are processed.

10. The system of claim 9, wherein the plurality of forwarding components tests a relevance level of the routing function by requesting that each of the plurality of hosts process one or more local sessions through the routing function, the relevance level is based at least in part on a minimum sufficient subset of routing functions to preserve session affinity.

11. The system of claim 9, wherein the forwarding components generate a new routing function that compensates for at least one of a host failure, an overloaded host, an underloaded host, an administrative operation, or any combination thereof.

12. A computer-implemented method of load balancing among a plurality of hosts, the method comprising:
   receiving a packet as part of a stream of packets that form at least one packet session;
   interrogating the packet for session information, the packet having a session ID unique to a packet session;
   analyzing the packet for a special tag indicating it is the first packet of a new session, the analysis comprising:
      assigning the packet to a host and forwarding the packet to a host if the packet is the first packet of a new session; or
      delivering the packet to its session's assigned host if the packet is not the first packet of a new session;
   generating a routing function based at least in part on data associated with the hosts based at least in part on a change in availability of the hosts, wherein the routing function provides a balanced distribution of sessions among the hosts; and
   one of either processing the packet in parallel based on both the new routing function and the original routing function for routing the packet to its session's assigned host if the packet is not the first packet of a new session by applying a corresponding session ID to the new routing function and the original routing function, wherein when results from the new routing function differ from the original routing function for the packet, the packet is duplicated and sent to the hosts corresponding to the new routing function and the original routing function, or processing the received packet based on the new routing function if the packet is the first packet of a new session.

13. The method of claim 12, further comprising at least one of the acts of:
   phasing out an old routing function; or
   purging an outdated routing function.

14. The method of claim 12, further comprising generating a non-uniform routing function that distributes session loading to compensate for a load skew.

15. The method of claim 12, further comprising processing the packet session through a plurality of forwarders such that each session packet received by each one of the forwarders is processed through a same routing function.

16. A computer-readable non-transitory storage medium comprising computer-executable instructions that, when executed on a processor, enable computer load balancing via operations comprising:
   receiving a stream of packets that includes a sequence of related packets that are associated with a session;

interrogating the sequence of packets to determine a session ID of a first packet of the session;
selecting at least one of a plurality of servers to which to forward the sequence of packets;
generating a hash function based at least in part on an availability of the plurality of servers;
forwarding the sequence of packets to a first server of the plurality of servers;
preserving a session affinity to the first server;
generating a new hash function based at least in part on a failure of the first server, the new hash function is added for processing in parallel with the hash function by applying a corresponding session ID to the new hash function and the hash function, wherein when results from the new hash function and the hash function differ for a packet, the packet is duplicated and sent to the hosts corresponding to the new hash function and the hash function; and
minimizing an effect on a session of another server based at least in part on both the hash function and the new hash function.

17. The computer-readable non-transitory storage medium of claim 16, wherein the computer-executable instructions enable operations further comprising purging an unnecessary hash function.

18. The computer-readable non-transitory storage medium of claim 16, wherein the computer-executable instructions enable operations further comprising generating a list of hashing exceptions based at least in part on one or more problematic sessions detected.

19. A computer-readable non-transitory storage medium comprising computer-executable instructions that, when executed on a processor, carry out the computer-implemented method of load balancing among the plurality of hosts of claim 12.

* * * * *